United States Patent
Hachiya et al.

(10) Patent No.: US 7,601,763 B2
(45) Date of Patent: Oct. 13, 2009

(54) DIAPHRAGM FOR SPEAKER AND MANUFACTURING METHOD THEREOF

(75) Inventors: Satoshi Hachiya, Yamagata (JP); Koji Matsumoto, Yamagata (JP); Shunji Takeda, Ehime (JP)

(73) Assignees: Pioneer Corporation, Tokyo (JP); Tohoku Pioneer Corporation, Tendo-Shi (JP)

( * ) Notice: Subject to any disclaimer, the term of this patent is extended or adjusted under 35 U.S.C. 154(b) by 519 days.

(21) Appl. No.: 11/526,575

(22) Filed: Sep. 26, 2006

(65) Prior Publication Data

US 2007/0072953 A1 Mar. 29, 2007

(30) Foreign Application Priority Data

Sep. 27, 2005 (JP) ............................. 2005-280399

(51) Int. Cl.
*C08J 9/00* (2006.01)
*G10K 11/00* (2006.01)
(52) U.S. Cl. ...................................... 521/142; 181/175
(58) Field of Classification Search ................ 521/142
See application file for complete search history.

(56) References Cited

U.S. PATENT DOCUMENTS 6,794,461 B2 * 9/2004 Fujita et al. .............. 525/330.4
2004/0247152 A1 12/2004 Greb et al.

FOREIGN PATENT DOCUMENTS

| DE | 2047096 | * | 9/1970 |
| JP | 2000-248104 | * | 12/2000 |
| JP | 2004-537243 | | 12/2004 |
| WO | WO 03/13187 | | 2/2003 |

* cited by examiner

*Primary Examiner*—Randy Gulakowski
*Assistant Examiner*—Kara Negrelli
(74) *Attorney, Agent, or Firm*—Young & Thompson

(57) ABSTRACT

A diaphragm for a speaker is made by forming acrylic foam. As the material of the acrylic foam, using maleic anhydride and methacrylic amide are contained. Thereby, the coefficient of saturated water absorption can be reduced. When the diaphragm thus manufactured is used for a speaker device, the decrease of strength due to the water absorption and the deterioration of the sound quality can be prevented even in a humid environment.

2 Claims, 4 Drawing Sheets

| MATERIAL NAME | COMPOSITION RATIO [wt%] |
|---|---|
| (1) METHYL METHACRYLATE | 30~70 |
| (2) METHACRYLIC ACID | 10~40 |
| (3) STYRENE | 5~30 |
| (4) MALEIC ANHYDRIDE | 1~20 |
| (5) METHACRYLIC AMIDE | 1~20 |

FIG. 1

| MATERIAL NAME | COMPOSITION RATIO [wt%] |
|---|---|
| (1) METHYL METHACRYLATE | 30~70 |
| (2) METHACRYLIC ACID | 10~40 |
| (3) STYRENE | 5~30 |
| (4) MALEIC ANHYDRIDE | 1~20 |
| (5) METHACRYLIC AMIDE | 1~20 |

FIG. 2

| | FOAMING MAGNIFICATION | DENSITY [kg/m³] | COMPRESSIVE STRENGTH [MPa] | SATURATED WATER ABSORPTION [wt%] |
|---|---|---|---|---|
| <COMPARATIVE EXAMPLE 1> MATERIALS (1) to (3) | 15 | 80 | 2.02 | — |
| <COMPARATIVE EXAMPLE 2> POLY(METH)ACRYLIMIDE | 15 | 70 | 1.63 | 30.0 |
| <THIS INVENTION> MATERIALS (1) to (5) | 15 | 80 | 1.67 | 4.0 |

DIAPHRAGM FOR SPEAKER AND MANUFACTURING METHOD THEREOF

BACKGROUND OF THE INVENTION

1. Field of the Invention

The present invention relates to a diaphragm used for a speaker device and a manufacturing method thereof.

2. Description of Related Art

There is known a diaphragm for a speaker made of acrylic foam, and an example thereof is disclosed in Published Japanese Translation of a PCT Application Laid-open under No. 2004-537243 (Reference-1). In the diaphragm for the speaker according to the Reference-1, poly(mete)acrylimide foam is used as a core layer.

As for the poly(mete)acrylimide foam, since the coefficient of saturated water absorption is high (substantially 30 wt %), decrease of strength caused by the water absorption is large. Therefore, when it is applied to the diaphragm for the speaker, if the speaker is used in a humid environment, sound quality deterioration caused by the decrease of strength is large. Particularly, when this diaphragm is used for an on-vehicle speaker and/or a marine speaker, the deterioration of the strength and the sound quality due to the water absorption is remarkable.

SUMMARY OF THE INVENTION

The present invention has been achieved in order to solve the above problems. It is an object of this invention to provide a diaphragm for a speaker with little deterioration of strength and sound quality, even when it is used in a high-temperature humid environment, and a manufacturing method thereof.

According to one aspect of the present invention, there is provided a diaphragm for a speaker, produced by forming acrylic foam made from methyl methacrylate, methacrylic acid, styrene, maleic anhydride and methacrylic amide.

The above diaphragm for the speaker is made of the acrylic foam. The acrylic foam is made by using the maleic anhydride and the methacrylic amide as the materials. Thereby, the coefficient of saturated water absorption can be reduced. When the diaphragm thus manufactured is used for the speaker device, the decrease of strength due to the water absorption and the deterioration of sound quality can be prevented even in the humid environment.

In a preferred example of the above diaphragm for the speakers the acrylic foam may be made from the methyl methacrylate of 30-70 wt %, the methacrylic acid of 10-40 wt %, the styrene of 5-30 wt %, the maleic anhydride of 1-20 wt % and the methacrylic amide of 1-20 wt %.

According to another aspect of the present invention, there is provided a manufacturing method of a diaphragm for a speaker including: a process of producing an acrylic resin made from methyl methacrylate, methacrylic acid, styrene, maleic anhydride and methacrylic amide; a process of making the acrylic resin form at foaming magnification of 5-30 times to produce acrylic foam; and a process of forming the acrylic foam.

In the above manufacturing method of the diaphragm for the speaker, the acrylic foam is formed, and the diaphragm for the speaker is produced. The acrylic foam is made by using the maleic anhydride and the methacrylic amide. Thereby, the coefficient of saturated water absorption can be reduced. When the diaphragm thus manufactured is used for the speaker device, the decrease of strength due to the water absorption and the deterioration of sound quality can be prevented even in the humid environment.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1 shows an example of a composition ratio of a diaphragm for a speaker according to an embodiment;

FIG. 2 shows a comparative result of characteristics such as compressive strength and coefficient of saturated water absorption of products according to the present invention and comparative examples;

DETAILED DESCRIPTION OP THE PREFERRED EMBODIMENTS

Now, a preferred embodiment of the present invention will be described below with reference to the attached drawings.

FIG. 1 shows an example of a composition ratio of the acrylic foam forming the diaphragm for the speaker (hereinafter also simply referred to as "diaphragm") according to an embodiment of the present invention. The diaphragm for the speaker according to this embodiment is manufactured by forming the acrylic foam of acrylic resin. As shown in FIG. 1, the acrylic resin is made by mixing (1) methyl methacrylate, (2) methacrylic acid, (3) styrene, (4) maleic anhydride and (5) methacrylic amide(metacrylamide), in accordance with the composition ratio shown in FIG. 1. In this embodiment, by mixing the maleic anhydride and the methacrylic amide, the pressure-resistant temperature can be improved without decreasing the strength.

FIG. 2 shows a comparative result of characteristics of the products according to two comparative examples and the present invention. All of the products according to the comparative examples 1 and 2 and the present invention show the characteristics of the acrylic foam. In the comparative example 1, (1) methyl methacrylate, (2) methacrylic acid, and (3) styrene are used as the material of the foam. Namely, as compared with the product of the present invention, the maleic anhydride and the methacrylic amide are not used. Meanwhile, in the comparative example 2, the poly(mete)acrylimide foam is used, similarly to the above-mentioned Reference-1. In the product of the present invention, (1) methyl methacrylate, (2) methacrylic acid, (3) styrene, (4) maleic anhydride and (5) methacrylic amide are used, as shown in FIG. 1. As shown in FIG. 2, in any one of the products, foaming magnification is uniformly set to 15 times.

As shown in FIG. 2, as for the product of the present invention, the compressive strength is almost equal to that of the comparative example 2, and the coefficient of saturated water absorption is much smaller than that of the comparative example 2. Therefore, it is understood that the coefficient of saturated water absorption can be improved by nixing the maleic anhydride and the methacrylic amide. As a result, the decreasing level of the strength can be made small, and it becomes possible that sound quality deterioration is hardly caused in a severe environment such as a humid environment.

Figure 3:
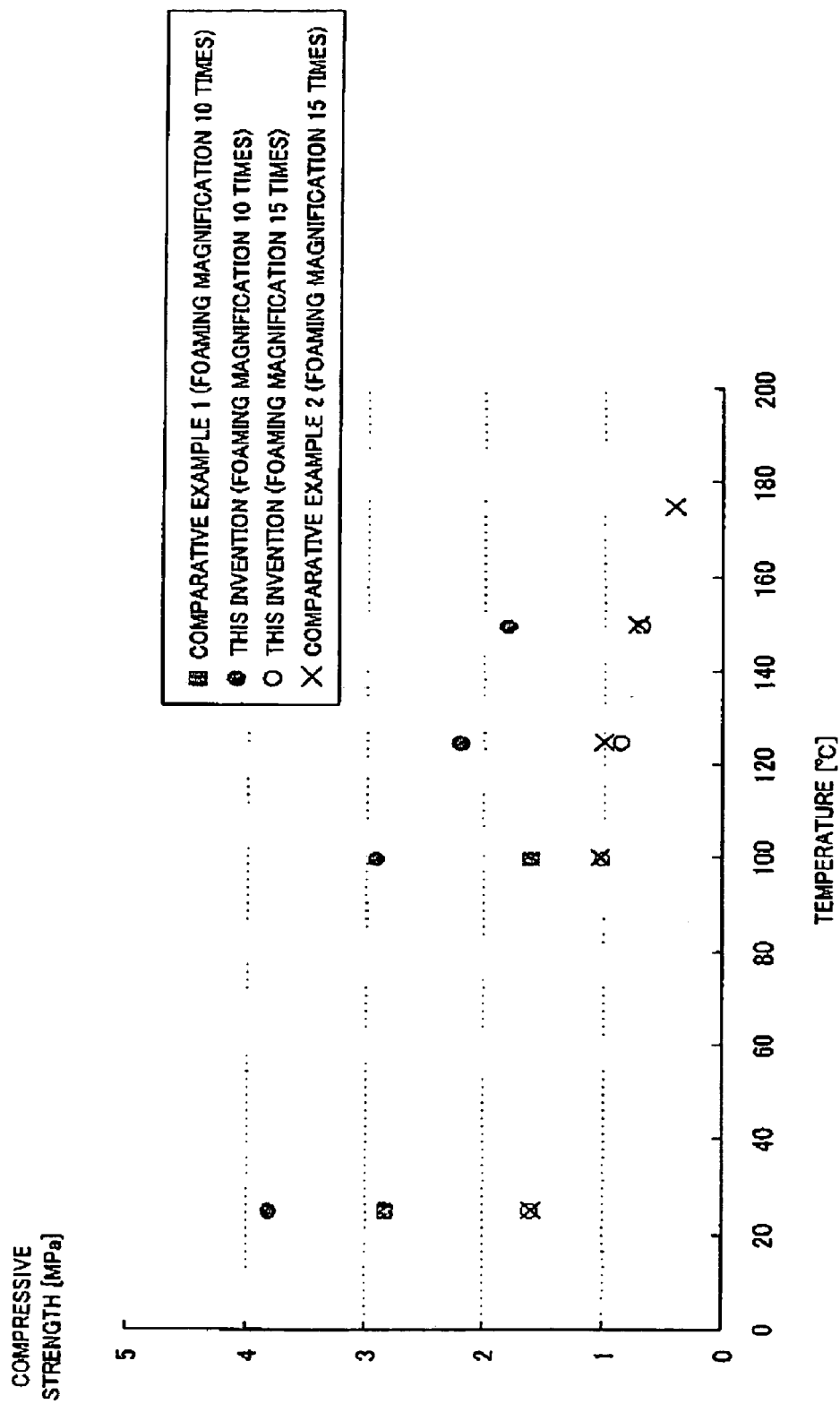
FIG. 3 shows temperature variations of the compressive strength of the products according to the present invention and the comparative examples.

FIG. 3 is a graph showing temperature variations of the compressive strength as for the products according to the comparative examples 1 and 2 and the present invention. The foaming magnification of the product of the comparative example 1 is 10 times, and the foaming magnification of the product of the comparative example 2 is 15 times. The foaming magnification of the products of the present invention are 10 times and 15 times, as shown.

When the product of the comparative example 1 and the product of the present invention having the foaming magnification of 10 times are compared, the compressive strength of the product of the present invention is higher at each temperature. Therefore, it is understood that the pressure-resistant temperature can be improved by mixing the maleic anhydride and the methacrylic amide. Next, when the product of the comparative example 2 and the product of the present invention having the foaming magnification of 15 times are compared, it is understood that both of the (compressive strength are almost equal to each other at each temperature. Namely, as compared with the comparative example 2, it is understood that the coefficient of saturated water absorption can be advantageously improved in the product of the present invention, without sacrificing the strength.

As described above, as compared with the comparative examples 1 and 2, the pressure-resistant temperature can be improved and the coefficient of saturated water absorption can be reduced without decreasing the strength in the present invention. Therefore, even in the severe environment such as the high-temperature humid environment, it is possible to provide the diaphragm with the sufficient strength and little sound quality deterioration.

Figure 4:
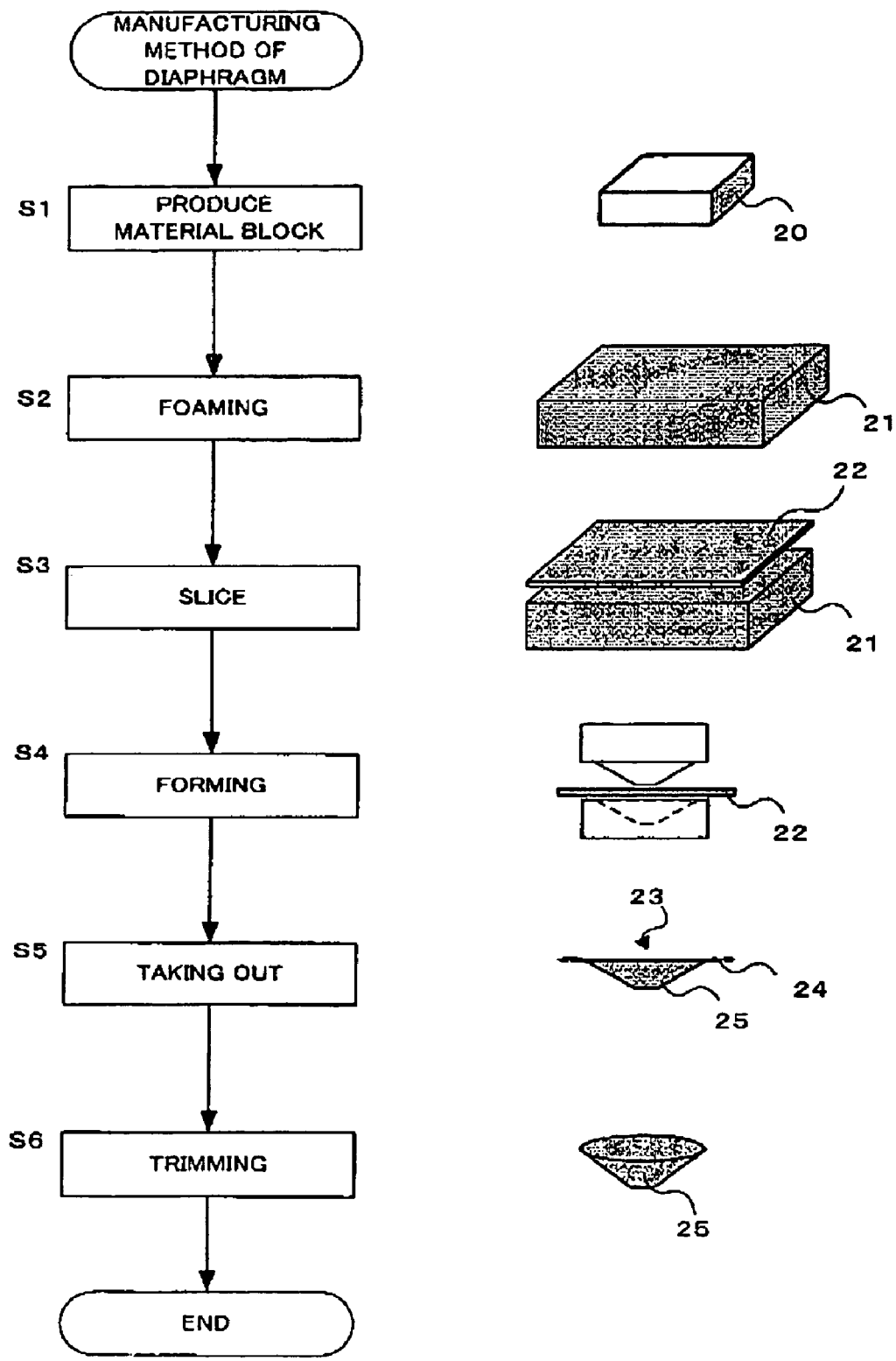
FIG. 4 is a diagram showing a process of manufacturing the diaphragm for the speaker.

FIG. 4 shows a process of the manufacturing method of the diaphragm according to the present invention. First, as shown in FIG. 1, the material block of an acrylic resin 20, which is made from (1) methyl methacrylate, (2) methacrylic acid, (3) styrene, (4) maleic anhydride and (5) methacrylic amide, is produced (step S1). Next, the acrylic foam 21 is produced by making the acrylic resin 20 foam (step S2). Then, the acrylic foam 21 is sliced to make a foam sheet 22 of a predetermined thickness (step S3). Then, the foam sheet 22 is heated and pressed to be formed into a diaphragm shape (e.g., a cone shape), thereby to make a product 23 (step S4). Next, the product 23 is taken out of the mold (step S5), and an outer peripheral portion 24 is trimmed off. In this way, a diaphragm 25 is produced.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2005-280399 filed on Sep. 27, 2005 including the specification, claims, drawings and summary is incorporated herein by reference in its entirety.

What is claimed is:

1. A diaphragm for a speaker, produced by forming acrylic foam made from methyl methacrylate, methacrylic acid, styrene, maleic anhydride and methacrylic amide.

2. The diaphragm for the speaker according to claim 1, wherein the acrylic foam is made from the methyl methacrylate of 30-70 wt %, the methacrylic acid of 10-40 wt %, the styrene of 5-30 wt %, the maleic anhydride of 1-20 wt % and the methacrylic amide of 1-20 wt %.

\* \* \* \* \*

UNITED STATES PATENT AND TRADEMARK OFFICE
CERTIFICATE OF CORRECTION

PATENT NO. : 7,601,763 B2
APPLICATION NO. : 11/526575
DATED : October 13, 2009
INVENTOR(S) : Hachiya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Fifth Day of October, 2010

David J. Kappos
*Director of the United States Patent and Trademark Office*